(12) United States Patent
Takakura

(10) Patent No.: US 11,940,794 B2
(45) Date of Patent: Mar. 26, 2024

(54) VEHICLE VIDEO CONTROL APPARATUS, VEHICLE VIDEO SYSTEM, VIDEO CONTROL METHOD, AND PROGRAM

(71) Applicant: JVCKENWOOD CORPORATION, Yokohama (JP)

(72) Inventor: Yutaka Takakura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 581 days.

(21) Appl. No.: 17/158,876

(22) Filed: Jan. 26, 2021

(65) Prior Publication Data

US 2021/0149400 A1 May 20, 2021

Related U.S. Application Data

(63) Continuation of application No. PCT/JP2019/042965, filed on Nov. 1, 2019.

(30) Foreign Application Priority Data

Feb. 13, 2019 (JP) ................................. 2019-023319

(51) Int. Cl.
*G05D 1/00* (2006.01)
*B60R 1/27* (2022.01)
(Continued)

(52) U.S. Cl.
CPC ............. *G05D 1/0094* (2013.01); *B60R 1/27* (2022.01); *B60R 1/28* (2022.01); *B60R 11/0229* (2013.01);
(Continued)

(58) Field of Classification Search
CPC .. G05D 1/0094; H04N 13/296; H04N 13/239; H04N 7/181; B60R 1/00;
(Continued)

(56) References Cited

U.S. PATENT DOCUMENTS

| 2014/0123770 A1* | 5/2014 | Lee ......................... G01L 3/104 73/862.193 |
| 2014/0132770 A1* | 5/2014 | Lee ........................... B60R 1/00 348/148 |

(Continued)

FOREIGN PATENT DOCUMENTS

| JP | 2006182234 A | 7/2006 |
| JP | 2008087651 A | 4/2008 |

(Continued)

*Primary Examiner* — Jaime Figueroa
*Assistant Examiner* — Joshua Alexander Garza
(74) *Attorney, Agent, or Firm* — Procopio, Cory, Hargreaves & Savitch LLP

(57) ABSTRACT

A vehicle video control apparatus includes a support control unit configured to control left and right support parts so that they can be positioned at first positions and at second positions, the left and right support parts being configured to support left and right image-pickup apparatuses disposed on left and right sides of a vehicle, the first positions being positions at which the left and right image-pickup apparatuses face in directions to the left-rear and right-rear of the vehicle, and the second positions being positions at which the left and right image-pickup apparatuses face in directions to the left/right of the vehicle, a display control unit configured to display video images taken by the left and right image-pickup apparatuses on a monitor, the monitor being configured so that a driver of the vehicle can see the monitor.

5 Claims, 8 Drawing Sheets

(51) Int. Cl.
 *B60R 1/28* (2022.01)
 *B60R 11/00* (2006.01)
 *B60R 11/02* (2006.01)
 *B60R 11/04* (2006.01)
 *H04N 7/18* (2006.01)
 *H04N 13/239* (2018.01)
 *H04N 13/296* (2018.01)

(52) U.S. Cl.
 CPC ............ *B60R 11/04* (2013.01); *H04N 7/181* (2013.01); *H04N 13/239* (2018.05); *H04N 13/296* (2018.05); *B60R 2011/0003* (2013.01); *B60R 2011/004* (2013.01); *B60R 2300/105* (2013.01); *B60R 2300/30* (2013.01)

(58) Field of Classification Search
 CPC ................ B60R 11/0229; B60R 11/04; B60R 2011/0003; B60R 2011/004; B60R 2300/105; B60R 2300/30
 See application file for complete search history.

(56) References Cited

U.S. PATENT DOCUMENTS

| | | | |
|---|---|---|---|
| 2015/0183371 A1* | 7/2015 | Okada | H04N 23/00 348/148 |
| 2015/0350607 A1* | 12/2015 | Kim | B60R 1/00 348/148 |
| 2019/0061625 A1* | 2/2019 | Göttlicher | B60R 1/06 |
| 2019/0118728 A1* | 4/2019 | Oba | G01S 15/931 |
| 2019/0176702 A1* | 6/2019 | Shidochi | B60R 1/06 |
| 2019/0191107 A1* | 6/2019 | Claezon | H04N 7/18 |
| 2019/0253603 A1* | 8/2019 | Miyagaki | G06T 7/0002 |
| 2020/0036903 A1 | 1/2020 | Sunaga | |
| 2021/0160433 A1* | 5/2021 | Berne | G01C 21/3461 |

FOREIGN PATENT DOCUMENTS

| | | |
|---|---|---|
| JP | 2013001298 A | 1/2013 |
| JP | 2014170357 A | 9/2014 |
| JP | 2018-196066 A | 12/2018 |
| WO | 2018061882 A1 | 4/2018 |

\* cited by examiner

VEHICLE VIDEO CONTROL APPARATUS, VEHICLE VIDEO SYSTEM, VIDEO CONTROL METHOD, AND PROGRAM

CROSS REFERENCE TO RELATED APPLICATION

This application is a Bypass Continuation of PCT/JP2019/042965 filed on Nov. 1, 2019, which is based upon and claims the benefit of priority from Japanese Patent Application No. 2019-023319, filed on Feb. 13, 2019, the entire contents of which are incorporated herein by reference.

BACKGROUND

The present invention relates to a vehicle video control apparatus, a vehicle video system, a video control method, and a program, and in particular to a vehicle video control apparatus, a vehicle video system, a video control method, and a program for a vehicle equipped with a camera.

In general, a dashboard camera is configured to mainly shoot (i.e., take an image of) a view in the direction to the front/rear of a vehicle, i.e., in the traveling direction thereof.

Japanese Unexamined Patent Application Publication No 2018-196066 discloses a dashboard camera that is equipped with a semi-spherical camera in order to also record the cause of an event or the like that occurs in the lateral direction of the vehicle in a parking monitoring mode. Further, in recent years, a vehicle has been equipped with electronic mirrors that display images obtained by cameras that shoot (i.e., take images of) views in the directions obliquely to the rear of the vehicle, instead of being equipped with side mirrors.

A dashboard camera is expected to take images of views in the directions to the front/rear of a vehicle and record the taken images when the vehicle is being used, including when the vehicle is traveling. Meanwhile, it is required that a dashboard camera monitor not only the directions to the front/rear of the vehicle but also the directions to the left/right thereof when the vehicle is parked. However, it is very difficult to appropriately record video images of the outside of the vehicle with the semi-spherical camera disclosed in Patent Literature 1. Further, if another camera(s) for monitoring views in the left/right directions is installed in the vehicle, the cost of the vehicle may increase.

SUMMARY

A vehicle video control apparatus according to an embodiment includes:
a support control unit configured to control a left support part and a right support part so that the left and right support parts can be positioned at first positions and at second positions, the left support part being configured to support a left image-pickup apparatus, the left image-pickup apparatus being disposed on a left side of a vehicle and configured to shoot a view to the left of the vehicle, the right support part being configured to support a right image-pickup apparatus, the right image-pickup apparatus being disposed on a right side of the vehicle and configured to shoot a view to the right of the vehicle, the first positions being positions at which the left image-pickup apparatus faces in a direction to the left-rear of the vehicle and the right image-pickup apparatus faces in a direction to the right-rear of the vehicle, and the second positions being positions at which the left image-pickup apparatus faces in a direction to the left of the vehicle and the right image-pickup apparatus faces in a direction to the right of the vehicle;
a display control unit configured to display video images taken by the left and right image-pickup apparatuses on a monitor, the monitor being configured so that a driver of the vehicle can see the monitor;
a recording control unit configured to use the video images taken by the left and right image-pickup apparatuses as monitoring information for monitoring the vehicle; and
a mode change unit configured to make the display control unit display the video images taken by the left and right image-pickup apparatuses on the monitor, which the driver of the vehicle can see, when the left and right support parts are positioned at the first positions by the support control unit, and make the recording control unit use the video images taken by the left and right image-pickup apparatuses as the monitoring information for monitoring the vehicle when the left and right support parts are disposed at the second positions.

Further, a vehicle video system according to an embodiment includes:
the above-described vehicle video control apparatus; and
the left and right image-pickup apparatuses, in which
each of the left and right image-pickup apparatuses includes a first camera and a second camera,
when the left and right support parts are positioned at the first positions, the first cameras face in directions to the left-rear and right-rear of the vehicle,
when the left and right support parts are disposed at the second positions, the second cameras face in directions to the left and right of the vehicle, and
an angle of view of taken video images taken by the second cameras is wider than that of taken video images taken by the first cameras.

Further, a video control method according to ab embodiment includes:
a support control step of controlling a left support part and a right support part so that the left and right support parts can be positioned at first positions and at second positions, the left support part being configured to support a left image-pickup apparatus, the left image-pickup apparatus being disposed on a left side of a vehicle and configured to shoot a view to the left of the vehicle, the right support part being configured to support a right image-pickup apparatus, the right image-pickup apparatus being disposed on a right side of the vehicle and configured to shoot a view to the right of the vehicle, the first positions being positions at which the left image-pickup apparatus faces in a direction to the left-rear of the vehicle and the right image-pickup apparatus faces in a direction to the right-rear of the vehicle, and the second positions being positions at which the left image-pickup apparatus faces in a direction to the left of the vehicle and the right image-pickup apparatus faces in a direction to the right of the vehicle; and
a mode change step of displaying the video images taken by the left and right image-pickup apparatuses on a monitor when the left and right support parts are positioned at the first positions by the support control step, and using the video images taken by the left and right image-pickup apparatuses as monitoring information for monitoring the vehicle when the left and right support parts are disposed at the second positions, the monitor being configured so that a driver of the vehicle can see the monitor.

Further, a video control program according to an embodiment causes a computer operating as a vehicle video control apparatus to perform:

a support control step of controlling a left support part and a right support part so that the left and right support parts can be positioned at first positions and at second positions, the left support part being configured to support a left image-pickup apparatus, the left image-pickup apparatus being disposed on a left side of a vehicle and configured to shoot a view to the left of the vehicle, the right support part being configured to support a right image-pickup apparatus, the right image-pickup apparatus being disposed on a right side of the vehicle and configured to shoot a view to the right of the vehicle, the first positions being positions at which the left image-pickup apparatus faces in a direction to the left-rear of the vehicle and the right image-pickup apparatus faces in a direction to the right-rear of the vehicle, and the second positions being positions at which the left image-pickup apparatus faces in a direction to the left of the vehicle and the right image-pickup apparatus faces in a direction to the right of the vehicle; and a mode change step of displaying the video images taken by the left and right image-pickup apparatuses on a monitor when the left and right support parts are positioned at the first positions by the support control step, and using the video images taken by the left and right image-pickup apparatuses as monitoring information for monitoring the vehicle when the left and right support parts are disposed at the second positions, the monitor being configured so that a driver of the vehicle can see the monitor.

DETAILED DESCRIPTION

First Embodiment

Figure 1:
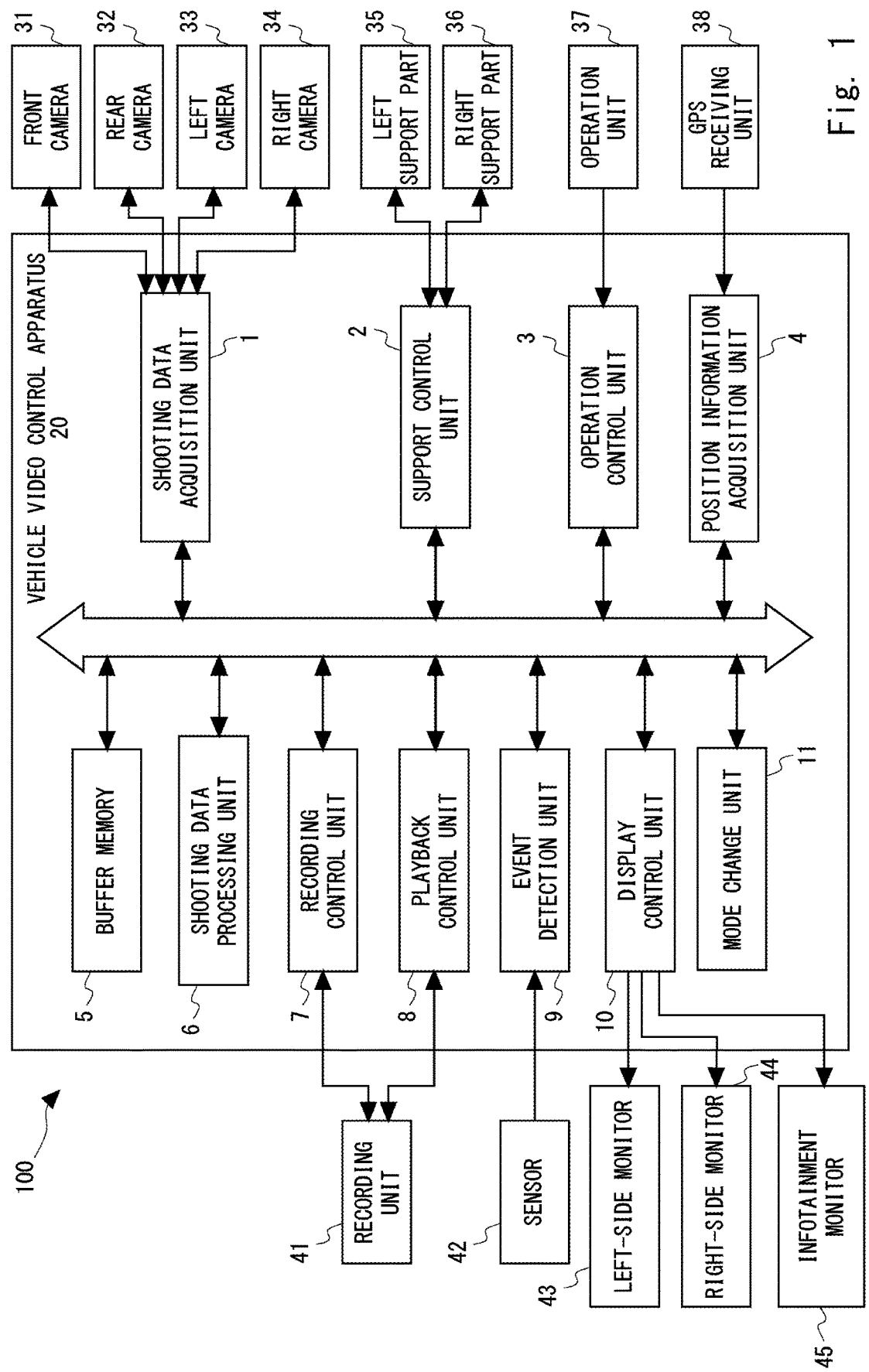
FIG. 1 is a block diagram showing an example of a configuration of a vehicle video system according to a first embodiment.
Figure 2:
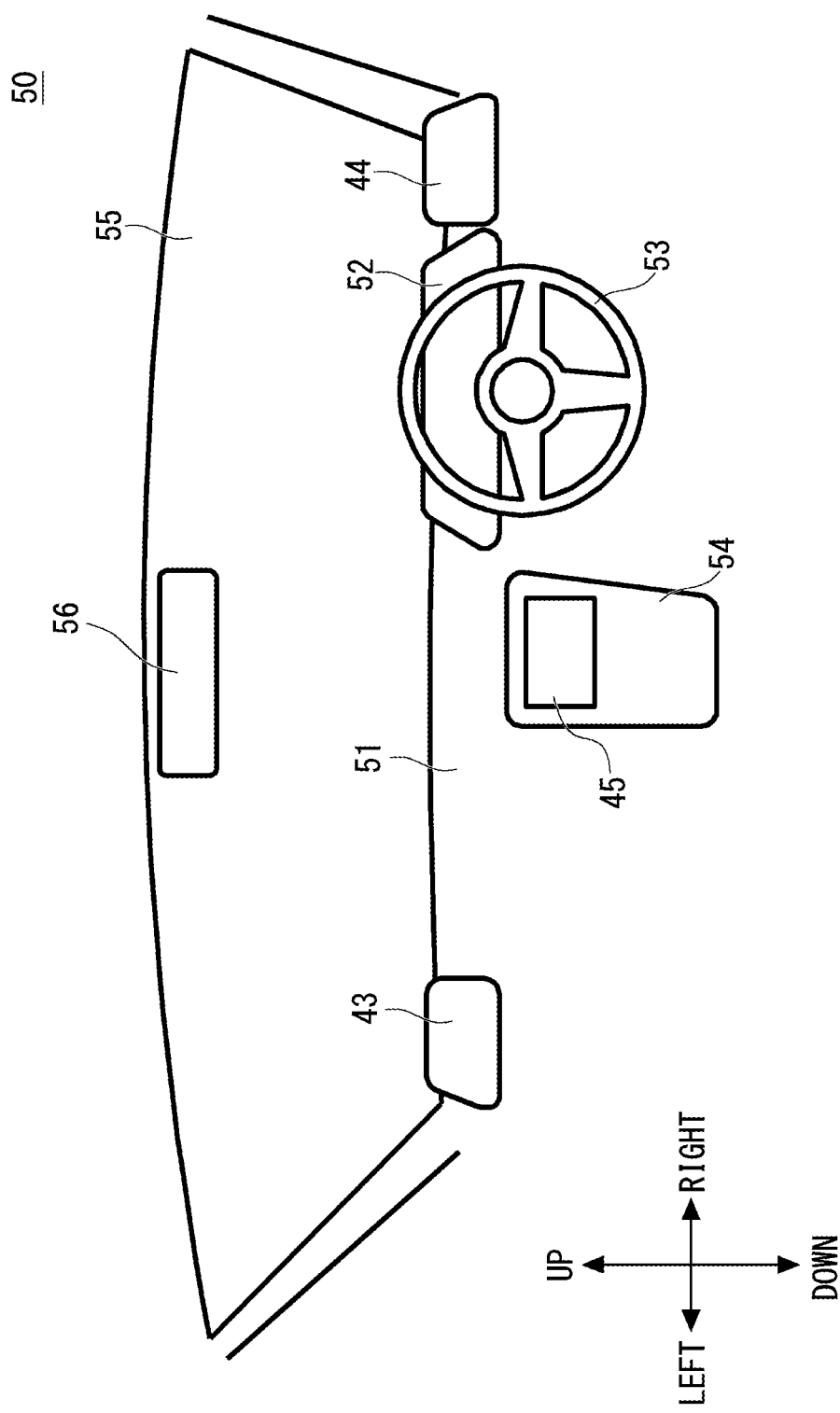
FIG. 2 is a schematic view showing an example of a configuration of a part of a vehicle, which is equipped with the vehicle video system according to the first embodiment, in front of the driver's seat of the vehicle.
Figure 3:
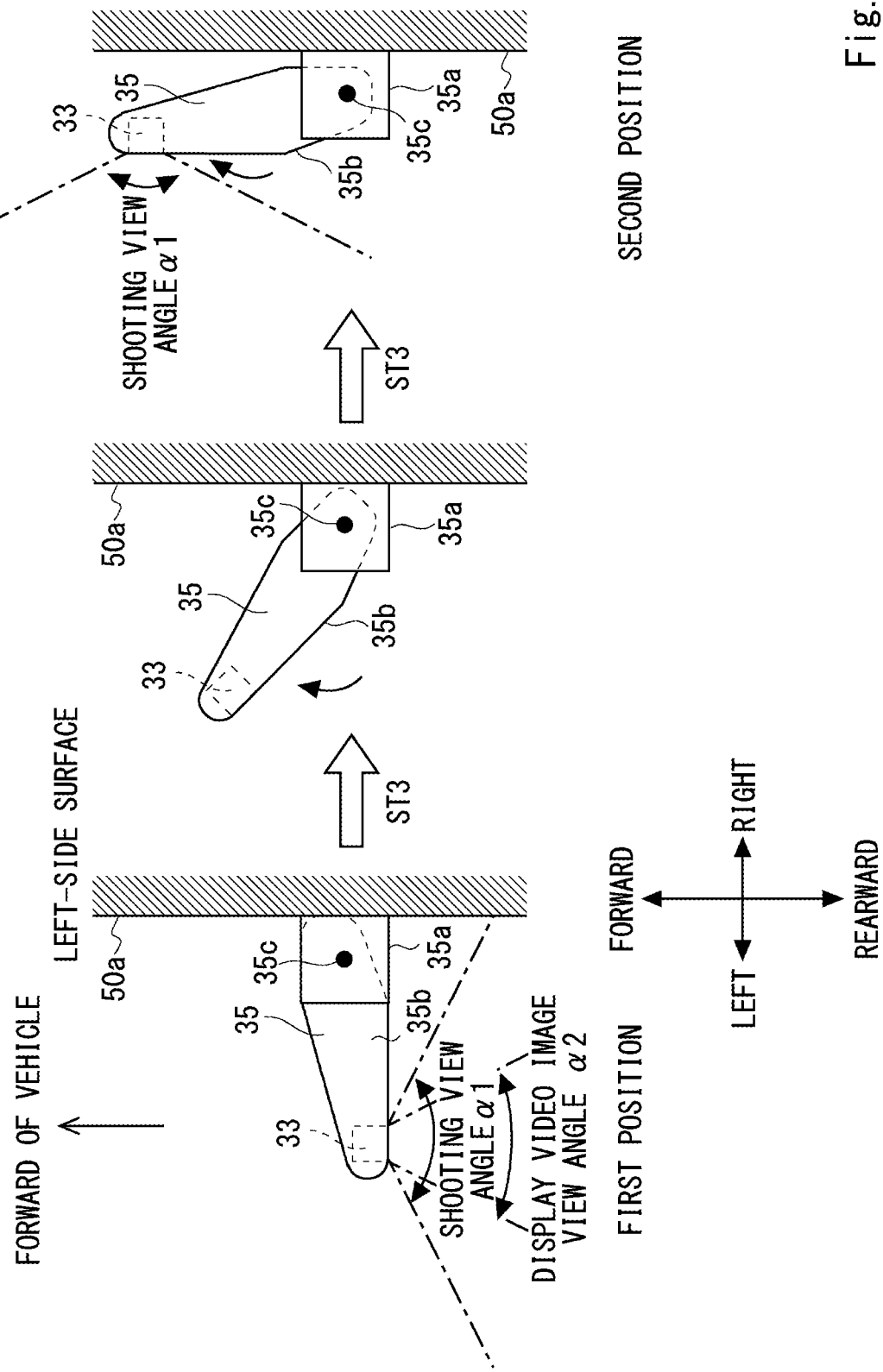
FIG. 3 is a schematic diagram showing an example of operations performed by the vehicle video system according to the first embodiment.
Figure 4:
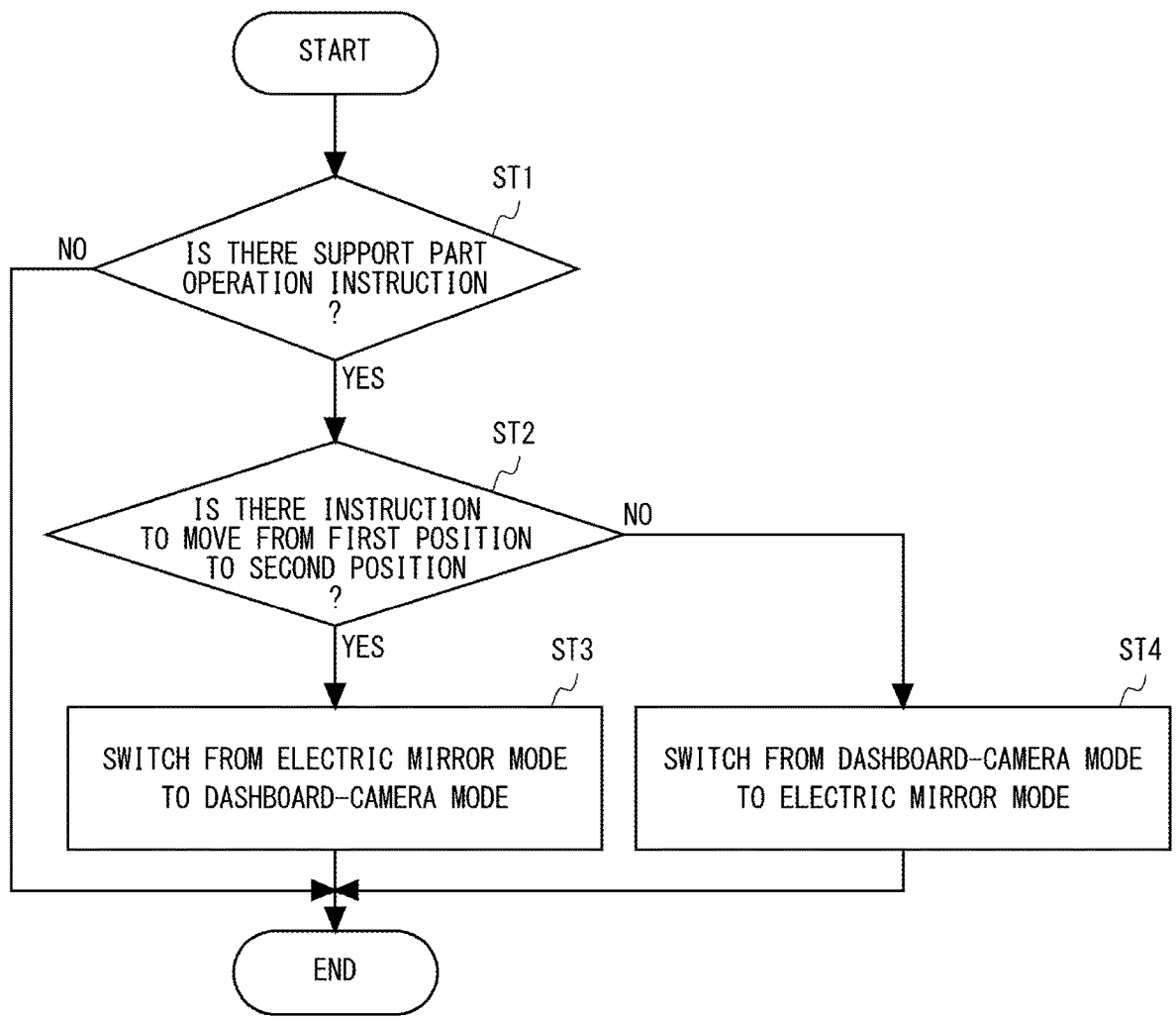
FIG. 4 is a flowchart showing an example of operations performed by the vehicle video system according to the first embodiment.

A first embodiment will be described hereinafter with reference to FIGS. 1 to 4. FIG. 1 is a block diagram showing an example of a configuration of a vehicle video system according to the first embodiment. FIG. 2 is a schematic view showing an example of a configuration of a part of a vehicle, which is equipped with the vehicle video system according to the first embodiment, in front of the driver's seat of the vehicle. FIG. 3 is a schematic diagram showing an example of operations performed by the vehicle video system according to the first embodiment. FIG. 4 is a flowchart showing an example of operations performed by the vehicle video system according to the first embodiment.

Note that, needless to say, three-dimensional orthogonal coordinate systems shown in FIG. 2 and other figures indicate a vertical direction, a left/right direction, and a front/rear direction, and are shown solely for a purpose of explaining positional relations among components. Normally, throughout the drawings, an upward direction is a vertically upward direction, and a plane extending in the longitudinal and left/right directions is a horizontal plane. FIG. 2 is a view from the inside of a vehicle 50 toward the front thereof. FIG. 3 is a view of a left-side surface 50a of the vehicle 50 as viewed from above.

As shown in FIG. 1, the vehicle video system 100 includes a vehicle video control apparatus 20, a front camera 31, a rear camera 32, a left camera 33, a right camera 34, a left support part 35, a right support part 36, an operation unit 37, a GPS receiving unit 38, a recording unit 41, a sensor(s) 42, a left-side monitor 43, a right-side monitor 44, and an infotainment monitor 45. The vehicle video system 100 is installed in the vehicle 50 shown in FIG. 2.

Each of the front camera 31, the rear camera 32, the left camera 33, and the right camera 34 may be an image pickup apparatus. That is, the front camera 31 is a front image-pickup apparatus and the rear camera 32 is a rear image-pickup apparatus, Further, the left camera 33 is a left image-pickup apparatus and the right camera 34 is a right image-pickup apparatus. The front and rear cameras 31 and 32 may be cameras used in ordinary dashboard cameras. Further, the left and right cameras 33 and 34 may be cameras used in ordinary electronic mirrors.

The front camera 31 is disposed on the front side of the vehicle 50 so as to face in the direction to the front of the vehicle 50, and shoots (i.e., takes an image of) a view in the direction to the front of the vehicle 50. The rear camera 32 is disposed on the rear side of the vehicle 50 so as to face in the direction to the rear of the vehicle 50, and shoots a view in the direction to the rear of the vehicle 50. Each of the front and rear cameras 31 and 32 outputs the taken video data to a shooting data acquisition unit 1.

As shown in FIG. 3, the left support part 35 includes a base 35a and an arm 35b. The base 35a is disposed on a left-side surface 50a of the vehicle 50. The arm 35b is disposed in the base 35a so as to be rotatable about a shaft 35c. The shaft 35c extends in a straight line in the vertical direction of the vehicle 50. Therefore, when the arm 35b rotates about the shaft 35c, it rotates on a horizontal plane of the vehicle 50. The left support part 35 rotationally moves the arm 35b based on a control signal received from a support control unit 2.

The left camera 33 is disposed on the rear side of the tip of the arm 35b. The left camera 33 faces in a direction roughly perpendicular to the longitudinal direction of the arm 35b on the horizontal plane of the vehicle 50.

By rotating the arm 35b about the axis 35c, the left camera 33 is positioned at a first position or a second position. When the longitudinal direction of the arm 35b is roughly perpendicular to the left-side surface 50a of the vehicle 50, the left camera 33 is positioned at the first position. The left camera 33 shoots a view in the direction to the left-rear of the vehicle 50. In most of the cases, when the left camera 33 is at the first position, the vehicle 50 is being driven by a driver and hence the left camera 33 functions as an electronic mirror.

When the front side of the tip of the arm 35b faces the left-side surface 50a of the vehicle 50, the left camera 33 is at the second position. The left camera 33 shoots a view in the direction to the left of the vehicle 50. The left camera 33 outputs the taken video data to the shooting data acquisition unit 1. In most of the cases, when the left camera 33 is at the second position, the vehicle 50 is parked and hence the left camera 33 functions as a dashboard camera.

The right support part 36 shown in FIG. 1 has a structure identical to that of the left support part 35, and is symmetrical to the left support part 35 with respect to the center line extending in the front/rear direction of the vehicle 50. Specifically, although details of the right support part 36 are not shown in the drawing, the right support part 36 has a structure that is obtained by replacing the reference numeral 35 with a reference numeral 36 in FIG. 3 and reversing (i.e., flipping over) the drawing in the left/right direction. Similar to the right support part 35, the right support part 36 includes a base 36a and an arm 36b. The base 36a is disposed on a right-side surface of the vehicle 50. The arm 36b is disposed in the base 36a so as to be rotatable about a shaft 36c. The shaft 36c extends in a straight line in the vertical direction of the vehicle 50. Therefore, when the arm 36b rotates about the shaft 36c, it rotates on a horizontal plane of the vehicle 50. The right support part 36 rotationally moves the arm 36b based on a control signal received from the support control unit 2.

The right camera 34 is disposed on the rear side of the tip of the arm 36b of the right support part 36. The right camera 34 faces in a direction roughly perpendicular to the longitudinal direction of the arm 36b on the horizontal plane of the vehicle 50.

By rotating the arms 35b and 36b about the axes 35c and 36c, respectively, the right camera 34 as well as the left camera 33 is positioned at the first positions or at the second positions. When the longitudinal directions of the arms 35b and 36b are roughly perpendicular to the right-side surface of the vehicle 50, the right camera 34 is positioned at the first position. The right camera 34 shoots a view in the direction to the right-rear of the vehicle 50.

When the front side of the tip of the arm 36b faces the right-side surface of the vehicle 50, the right camera 34 is positioned at the second position. The right camera 34 shoots a view in the direction to the right of the vehicle 50. The right camera 34 outputs the taken video data to the shooting data acquisition unit 1.

The operation unit 37 serves as an interface that receives an operation input from an operator such as a driver, generates a signal indicating the received operation, and outputs the generated signal to an operation control unit 3.

The GPS receiving unit 38 receives signals from a GPS (Global Positioning System) and outputs the received signals to a position information acquisition unit 4.

The recording unit 41 stores shooting data that a recording control unit 7 has acquired from the shooting data acquisition unit 1. The recording unit 41 is, for example, a semiconductor memory device such as an EPROM (Erasable PROM), a flash ROM, a RAM (Random Access Memory); or a storage device such as a hard disk drive, an optical disk, a memory card, or an external storage device connected through a network. The recording unit 41 may be an external storage device that is wirelessly connected through a communication apparatus (not shown). Recodes are read from or added to the recording unit 41 by the recording control unit 7 and a playback control unit 8.

The sensor 42 is a sensor(s) that measures a wide variety of objects to be measured as appropriate, and includes, for example, an acceleration sensor that measures an acceleration. The sensor 42 outputs measured measurement results to an event detection unit 9.

The left-side monitor 43 is a display apparatus including, for example, a liquid crystal display or an OLED (Organic Light-Emitting Diode) display. The left-side monitor 43 displays a video image taken by the left camera 33 of the vehicle 50 based on a video signal output from a display control unit 10.

The right-side monitor 44 is a display apparatus including, for example, a liquid crystal display or an OLED display. The right-side monitor 44 displays a video image taken by the right camera 34 of the vehicle 50 based on a video signal output from the display control unit 10.

The infotainment monitor 45 is a display apparatus including, for example, a liquid crystal display or an OLED display. The infotainment monitor 45 displays a wide variety of images based on video signals output from the display control unit 10. The information monitor 45 may be a dedicated one for the vehicle video system 100, or may be one that is shared with, for example, other systems including a navigation system.

As shown in FIG. 1, the vehicle video control apparatus 20 includes the shooting data acquisition unit 1, the support control unit 2, the operation control unit 3, the position information acquisition unit 4, a buffer memory 5, a shooting data processing unit 6, the recording control unit 7, the playback control unit 8, the event detection unit 9, the display control unit 10, and a mode change unit 11.

The vehicle video control apparatus 20 may be formed by a processor such as a CPU (Central Processing Unit). That is, the vehicle video control apparatus 20 can have functions as a computer. The vehicle video control apparatus 20 can execute a program stored in a storage device and thereby perform various types of processing. Further, the vehicle video control apparatus 20 implements the shooting data acquisition unit 1, the support control unit 2, the operation control unit 3, the position information acquisition unit 4, the shooting data processing unit 6, the recording control unit 7, the playback control unit 8, the event detection unit 9, the display control unit 10, and the mode change unit 11 by executing the program.

The storage device can include, for example, a DDR (Double Data Rate) memory, a Flash memory (flash memory), and the like as a part of the vehicle video control apparatus 20 or outside the vehicle video control apparatus 20. Further, the vehicle video system 100 may also include an EEPROM as part of the vehicle video control apparatus 20 or outside the vehicle video control apparatus 20. The storage device may be the recording unit 41.

Note that each of the components of the vehicle video system 100 is not limited to one implemented by the program, and may be implemented by hardware, a combination of hardware and a program, or the like. Further, each of the components of the vehicle video control apparatus 20 may be implemented by using an integrated circuit that can be programmed by a user, such as an FPGA (field-programmable gate array) or a microcomputer. As described above, the vehicle video control apparatus 20 may implement the function of each of the components of the vehicle video control apparatus 20 by using the integrated circuit.

Each of the components constituting the vehicle video control apparatus 20, such as the shooting data acquisition unit 1, the support control unit 2, the operation control unit 3, the position information acquisition unit 4, the shooting data processing unit 6, the recording control unit 7, the playback control unit 8, the event detection unit 9, the display control unit 10, and the mode change unit 11 may be software or a module by which its processing is performed as the processor executes a program stored in the memory. Alternatively, each of the components constituting the vehicle video control apparatus 20 may be hardware such as a circuit or a chip.

The shooting data acquisition unit 1 acquires video data generated by the front, rear, left, and right cameras 31, 32, 33 and 34. Data including such video data may be referred to as shooting data. In other words, the shooting data acquisition unit 1 may acquire shooting data from the front and rear cameras 31 and 32, and the left and right cameras 33 and 34. The shooting data may include audio data in addition to the video data.

The operation control unit 3 generates operation input information based on a signal sent from the operation unit 37 and outputs the generated operation input information to the support control unit 2. The operation input information generated by the operation control unit 3 indicates, for example, an operation for switching the positions of the left and right support parts 35 and 36 to either the first positions or the second positions.

The support control unit 2 acquires the operation input information from the operation control unit 3. Further, the support control unit 2 acquires power ON/OFF information indicating whether the power of the vehicle 50 is in an ON-state or in an OFF-state. The support control unit 2 may acquire the power ON/OFF information of the vehicle 50, for example, through a CAN (Controller Area Network). Further, the support control unit 2 may acquire, for example, various types of detection information sent from the various sensors 42 such as an acceleration sensor, and derive the power ON/OFF information of the vehicle 50 by performing calculation using the acquired various types of detection information. When the operation input information and the power ON/OFF information indicate that the power of the vehicle 50 is in an ON-state, it means that the vehicle 50 is being driven by a driver. When the operation input information and the power ON/OFF information indicate that the power of the vehicle 50 is in an OFF-state, the vehicle 50 is parked.

The support control unit 2 sends a control signal corresponding to the operation input information and the power ON/OFF information sent from the operation control unit 3 to the left and right support parts 35 and 36. When the operation input information and the power ON/OFF information indicate that the power of the vehicle 50 is in an ON-state, the support control unit 2 sends a control signal for positioning the left and right support parts 35 and 36 at the first positions. When the operation input information and the power ON/OFF information indicate that the power of the vehicle 50 is in an OFF-state, the support control unit 2 sends a control signal for positioning the left and right support parts 35 and 36 at the second positions.

The position information acquisition unit 4 acquires signals received by the GPS receiving unit 38 and generates current position information of the vehicle 50. The buffer memory 5 temporarily stores, for example, output shooting data.

The shooting data processing unit 6 generates shooting data in the form of a data file over a certain period from the shooting data temporarily stored in the buffer memory 5 by using an arbitrary method such as H.264 or MPEG-4 (Moving Picture Experts Group).

The recording control unit 7 records the shooting data generated by the shooting data processing unit 6 in the recording unit 41 as overwritable data or write-protected data. For example, the recording control unit 7 may record the shooting data in the recording unit 41 while specifying an address in a memory area in which data stored in the recording unit 41 can be overwritten or is prohibited from being overwritten. Alternatively, the recording control unit 7 may set, in a header or a payload of the shooting data, flag information indicating whether the shooting data can be overwritten or is prohibited from being overwritten. When the event detection unit 9 outputs information indicating that an event has occurred to the recording control unit 7, the recording control unit 7 records shooting data over a period that starts a predetermined time before the event and ends a predetermined time after the event in the recording unit 41 as write-protected data.

The playback control unit 8 acquires the shooting data recorded in the recording section 41, and outputs video data obtained based on the acquired shooting data to the display control unit 10.

The event detection unit 9 detects the occurrence of an event by using information output from the sensor 42. For example, when an acceleration detected by the sensor 42 that operates as an acceleration sensor exceeds a predetermined value, the event detection unit 9 detects that an event has occurred. The fact that the acceleration exceeds the predetermined value may also be expressed as that an impact corresponding to an accident has been exerted to the vehicle 50. Further, when the vehicle 50 is parked, the event detection unit 9 may detect a moving object from the video data acquired by the shooting data acquisition unit in addition to detecting an event based on an acceleration, and regard the detection of the moving object as the occurrence of an event. When the event detection unit 9 has detected the occurrence of an event, it outputs information indicating the occurrence of the event to the recording control unit 7. The information indicating the occurrence of the event includes a time when the event occurred. Further, the information indicating the occurrence of the event may include details of the event that has occurred.

The display control unit 10 displays video images based on the video data acquired from the playback control unit 8, the buffer memory 5, and the like on the left-side monitor 43, the right-side monitor 44, the infotainment monitor 45, and the like.

The display control unit 10 cuts out predetermined areas from the video data taken by the left and right cameras 33 and 34, and thereby generates video data that is displayed on the left-side and right-side monitors 43 and 44. For example, when the angle of view shot by the left and right cameras 33 and 34 is, for example, 150 to 180 degrees in the horizontal direction and 90 to 120 degrees in the vertical direction, the display control unit 10 cuts out areas of 60 to 90 degrees in the horizontal direction and 45 to 60 degrees in the vertical direction from the video data taken by the left and right cameras 33 and 34, and displays the cut-out areas on the left-side and right-side monitors 43 and 44, respectively.

When the support control unit 2 has positioned the left and right support parts 35 and 36 at the first positions, the mode change unit 11 makes the display control unit 10 display the video data taken by the left and right cameras 33 and 34 on the left-side and right-side monitors 43 and 44, respectively. Further, when the support control unit 2 has positioned the left and right support parts 35 and 36 at the second positions, the mode change unit 11 makes the recording control unit 7 use the video data taken by the left and right cameras 33 and 34 as monitoring information for monitoring the vehicle 50. In other words, when the left and right support parts 35 and 36 are positioned at the first positions, the mode change unit 11 makes the left-side and right-side monitors 43 and 44, which are electronic mirrors, display images with which the driver checks areas in the directions to the left-rear and right-rear of the vehicle 50. When the left and right support parts 35 and 36 are positioned at the second positions, the mode change unit 11 makes them function as dashboard cameras and record video images of views in the directions to the left/right of the vehicle 50. That is, the mode change unit 11 switches the mode between an electronic-mirror mode and a dashboard-camera mode.

FIG. 2 is a schematic view showing an example of a configuration of a part of a vehicle, which is equipped with the vehicle video system 100 according to the first embodiment, in front of the driver's seat of the vehicle. In the vehicle 50 shown in FIG. 2, a video image is displayed on a landscape infotainment monitor 45 disposed in a center console 54. Further, in addition to the infotainment monitor 45 and the center console 54, the left-side monitor 43, the right-side monitor 44, a dashboard 51, an instrument panel 52, a steering wheel 53, a windshield 55, a rear view monitor 56, etc. are arranged in front of the driver's seat inside the vehicle shown in FIG. 2.

The left-side monitor 43, the right-side monitor 44, and the infotainment monitor 45 are disposed at such positions that a driver can see them. In the example shown in FIG. 2, the left-side monitor 43 is disposed on the left side of the dashboard 51 in the left/right direction of the vehicle 50. The right-side monitor 44 is disposed on the right side of the dashboard 51 in the left/right direction of the vehicle 50. The infotainment monitor 45 is disposed in the center console 54 positioned near the center of the dashboard 51 in the left/right direction.

The instrument panel 52 is disposed in the dashboard 51 below the windshield 55, and displays a speedometer, an engine tachometer, and the like.

The steering wheel 53 is used by a driver to perform a steering operation. The steering direction of the vehicle is changed according to the steering operation performed using the steering wheel 53.

The rear view monitor 56 is a monitor with which the driver checks an area behind the vehicle, and is, for example, an electronic room mirror or a display apparatus including, for example, a liquid crystal display or an OLED display. The rear view monitor 56 may display a video image that is obtained by shooting a view in the direction to the rear of the vehicle 50 based on a video signal sent from the display control unit 10. The rear view monitor 56 is disposed at such a position that the driver can see it. The rear view monitor 56 according to this embodiment is disposed at the center in the left/right direction in the upper part of the windshield 55.

(Operation)

An example of operations performed by the vehicle video system 100 will be described with reference to FIGS. 3 and 4.

The mode change unit 11 determines whether or not the operation control unit 3 has received an instruction to operate the left and right support parts 35 and 36 (Support part operation instruction determination step ST1).

When an instruction to operate the left and right support parts 35 and 36 is received (Support part operation instruction determination step ST1: YES), the mode change unit 11 determines whether or not the received instruction is an instruction indicating that the left and right support parts 35 and 36 should be moved from the first positions and positioned at the second positions (Second position positioning instruction determination step ST2).

When the instruction received in the step ST1 indicates that the left and right support parts 35 and 36 should be moved from the first positions and positioned at the second positions (Second position positioning instruction determination step ST2: YES), the mode change unit 11 switches the mode from an electronic-mirror mode to a dashboard-camera mode (Dashboard camera mode switching step ST3).

When the mode is switched to the dashboard-camera mode, the support control unit 2 sends a control signal to the left and right support parts 35 and 36, and thereby rotates the left and right support parts 35 and 36 from the first positions toward the left-side surface 50a of the vehicle 50 so that they get close to the left-side surface 50a, and elementally positions them at the second positions. When the left and right support parts 35 and 36 are positioned at the second positions, video images taken by the left, right, front, and rear cameras 33, 34, 31, and 32 are recorded in the recording unit 41 as video images for the dashboard camera function. The recording control unit 7 records video image taken by the left and right cameras 33 and 34 in the recording unit 41 as video data of an angle of view $\alpha1$ (hereinafter also referred to as a view angle $\alpha1$). The view angle $\alpha1$ may be any angle as long as video images taken by the left and right cameras 33 and 34 have a width suitable as recorded video images of the dashboard cameras, and may be equal to the maximum angle of view of the left and right cameras 33 and 34. The view angle $\alpha1$ is, for example, 150 to 180 degrees in the horizontal direction and 90 to 120 degrees in the vertical direction. The video images recorded in the recording unit 41 can be used as monitoring information.

On the other hand, when the received instruction does not indicate that the left and right support parts 35 and 36 should be moved from the first positions and positioned at the second positions, i.e., when the received instruction indicates that the left and right support parts 35 and 36 should be moved from the second positions and positioned at the first positions (Second position positioning instruction determination step ST2: NO), the mode change unit 11 switches the mode from the dashboard-camera mode to the electronic-mirror mode (Electronic mirror mode switching step ST4).

When the mode is switched to the electronic-mirror mode, the left and right support parts 35 and 36 are positioned at the first positions. At the first positions, a video image taken by the left camera 33 is displayed on the left-side monitor 43, and a video image taken by the right camera 34 is displayed on the right-side monitor 44.

Specifically, the shooting data acquisition unit 1 acquires video images taken by the left and right cameras 33 and 34, and the display control unit 10 displays the acquired video images on the left-side and right-side monitors 43 and 44, respectively. In this case, the display control unit 10 displays video images that are obtained by cutting out parts of the view angles $\alpha1$ of the video images taken by the left and right cameras 33 and 34 on the left-side and right-side monitors 43 and 44, respectively. A view angle $\alpha2$ of display video images displayed on the left-side and right-side monitors 43 and 44 is, for example, 60 to 90 degrees in the horizontal direction. The view angle $\alpha2$ is preferably narrower than the view angle $\alpha1$. The view angle $\alpha2$ preferably has a width that is suitable when the display images are used for the electronic mirrors. The view angle α2 is, for example, 60 to 90 degrees in the horizontal direction and 45 to 60 degrees in the vertical direction.

Further, when the left and right support parts 35 and 36 are positioned at the first positions, video images taken by the front and rear cameras 31 and 32 are recorded in the recording unit 41 as video images for the dashboard camera function. Specifically, shooting data that are obtained based on video images taken by the front and rear cameras 31 and 32 are temporarily stored in the buffer memory 5 and processed by the shooting data processing unit 6, so that a predetermined file(s) is generated. The shooting data processing unit 6 encodes and processes the acquired shooting data by a codec using an arbitrary method such as H.264 or MPEG-4. The predetermined file is a file in an arbitrary file format such as an MP4 format, and the time of the taken video image indicated by the predetermined file has an arbitrary length such as 60 seconds. The recording control unit 7 records the file generated by the shooting data processing unit 6 in the recording unit 41 in an overwritable state.

Note that when the event detection unit 9 acquires an output of the sensor 42 that can be determined to be as an event, the recording control unit 7 stores a video image that is obtained over a period that starts a predetermined time before the event and ends a predetermined time after the event in the recording unit 41 as write-protected data.

That is, when the left and right support parts 35 and 36 are positioned at the first positions, video images taken by the left and right cameras 33 and 34 are used as images for electronic mirrors, and video images taken by the front and rear cameras 31 and 32 are used as video images of the dashboard cameras. Further, when the left and right support parts 35 and 36 are positioned at the second positions, video images taken by the front and rear cameras 31 and 32, in addition to the video images taken by the left and right cameras 33 and 34, are also used as video images of the dashboard cameras.

Because of the above-described features, according to the vehicle video system 100, it is possible to shoot a view in the direction to the front/rear of the vehicle 50 when the vehicle 50 is being used or is traveling, and to recode the taken video images. Meanwhile, when the vehicle 50 is parked, it is possible to shoot views in the directions to the left/right of the vehicle 50, in addition to the view in the directions to the front/rear thereof, and to recode the taken video images. It is possible to monitor areas in the directions to the left/right of the parked vehicle 50 by using the recorded video images as monitoring information. Further, it is possible to enable the vehicle video system 100 to achieve the above-described effects by using front and rear cameras 31 and 32 used in ordinary dashboard cameras or the like, and left and right cameras 33 and 34 used in ordinary electronic mirrors or the like. That is, it is possible to enable the vehicle video system 100 to achieve the above-described effects by using hardware configurations used in ordinary dashboard cameras and ordinary electronic mirrors without using additional hardware configurations, and thereby to reduce the increase in the cost.

Second Embodiment

Figure 5:
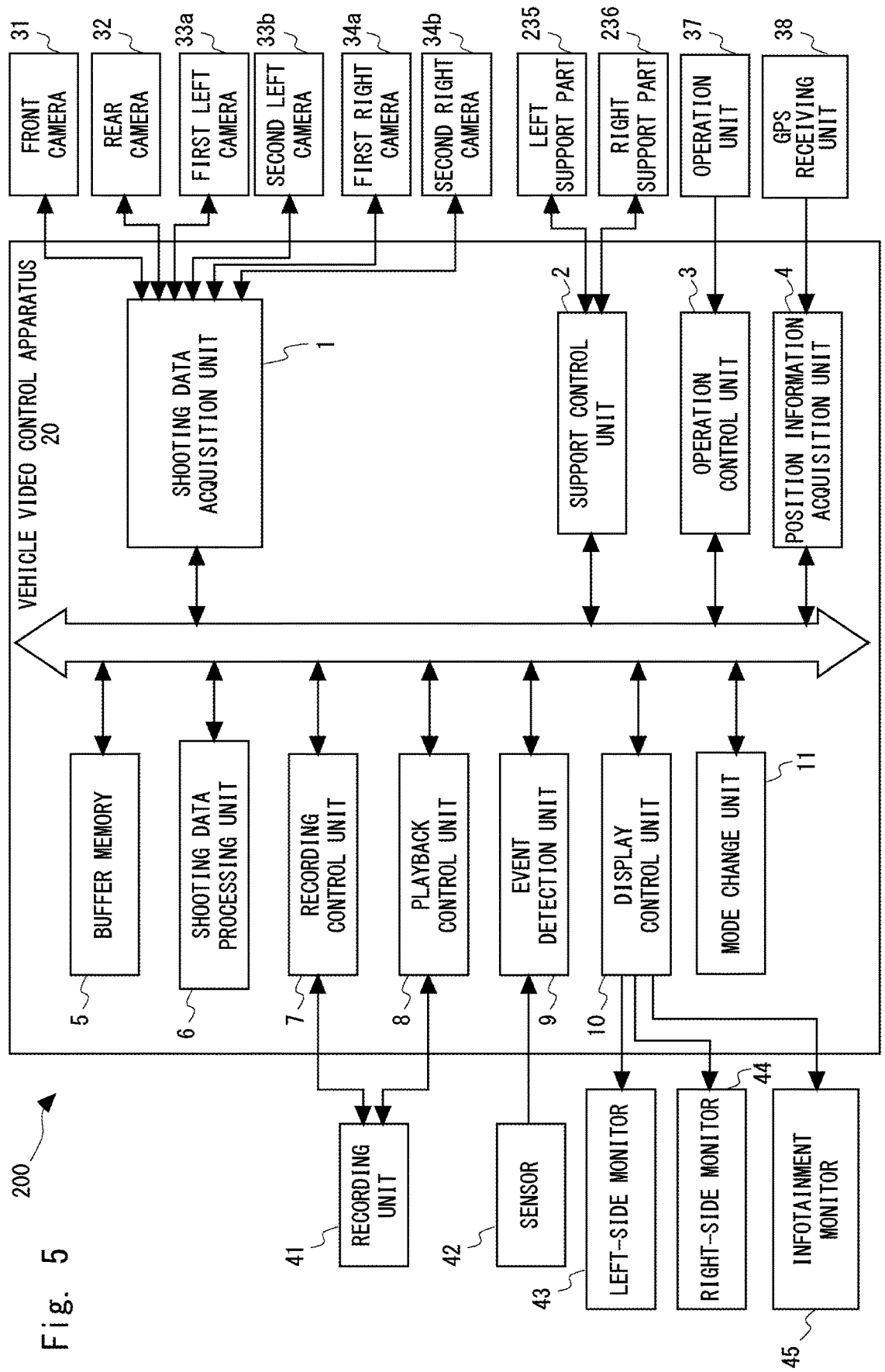
FIG. 5 is a block diagram showing an example of a configuration of a vehicle video system according to a second embodiment.
Figure 6:
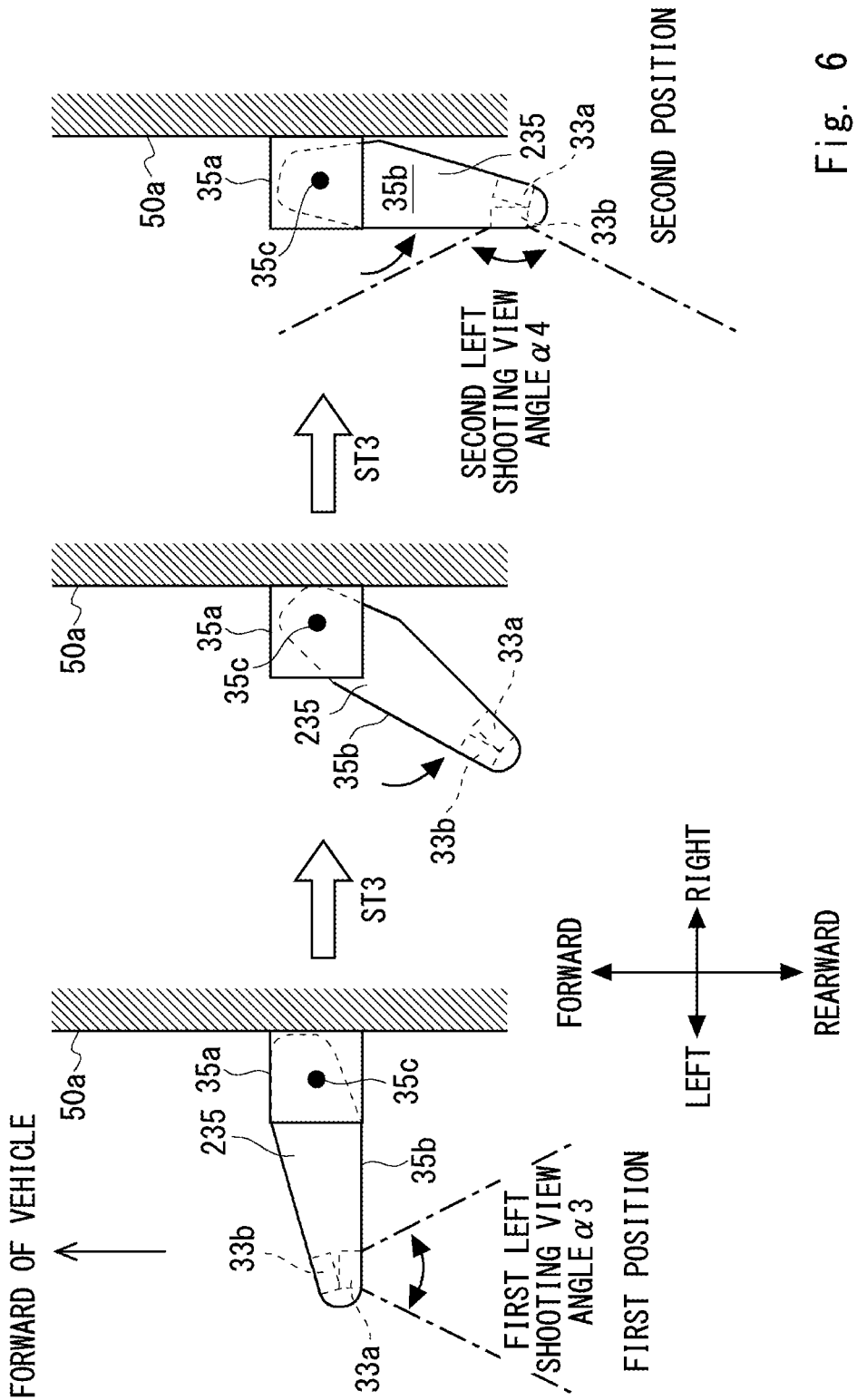
FIG. 6 is a schematic diagram showing an example of operations performed by the vehicle video system according to the second embodiment.

A second embodiment will be described hereinafter with reference to FIGS. 5 and 6. FIG. 5 is a block diagram showing an example of a configuration of a vehicle video system according to the second embodiment. FIG. 6 is a schematic view showing an example of operations performed by the vehicle video system according to the second embodiment, and is a view of a left-side surface 50a of a vehicle 50 as viewed from above. The vehicle video system 200 according to the second embodiment has a configuration identical to that of the vehicle video system 100 shown in FIG. 1 except for the left and right support parts, and the left and right cameras.

As shown in FIG. 5, the vehicle video system 200 includes a first left camera 33a, a second left camera 33b, a first right camera 34a, a second right camera 34b, a left support part 235, and a right support part 236.

Each of the first left camera 33a, the second left camera 33b, the first right camera 34a, and the second right camera 34b may be an image pickup apparatus. That is, the first and second left cameras 33a and 33b constitute a left image-pickup apparatus, and the first and second right cameras 34a and 34b constitute a right image-pickup apparatus. Each of the first left, second left, first right, and second right cameras 33a, 33b, 34a, and 34b may be a camera used in an ordinary electronic mirror.

The left support part 235 has a configuration identical to that of the left support part 35 shown in FIGS. 1 and 3 except for operations performed by the arm 35b. The first left camera 33a is disposed on the rear side of the tip of the arm 35b. The second left camera 33b is disposed on the front side of the tip of the arm 35b. The first left camera 33a faces in a direction roughly perpendicular to the longitudinal direction of the arm 35b on a horizontal plane of the vehicle 50, and the second left camera 33b faces in a direction opposite to the direction in which the first left camera 33a faces. By rotating the arm 35b shown in FIG. 6 about the axis 35c, the first and second left cameras 33a and 33b are positioned at first positions or at second positions.

When the longitudinal direction of the arm 35b is roughly perpendicular to the left-side surface 50a of the vehicle 50, the first and second left cameras 33a and 33b are positioned at the first positions. In this case, the first left camera 33a shoots a view in the direction to the left-rear of the vehicle 50. The first left camera 33a outputs the taken video data to the shooting data acquisition unit 1.

When the rear side of the tip of the arm 35b faces the left-side surface 50a of the vehicle 50, the first and second left cameras 33a and 33b are positioned at the second positions. In this case, the second left camera 33b shoots a view in the direction to the left of the vehicle 50. The second left camera 33b outputs the taken video data to the shooting data acquisition unit 1.

Each of the second left and second right cameras 33b and 34b is preferably be able to take a video image having a larger angle of view than that of the first left and first right cameras 33a and 34a. Each of the second left and second right cameras 33b and 34b is a camera that performs shooting with a view angle α4 of, for example, 150 to 180 degrees in the horizontal direction and 90 to 120 degrees in the vertical direction. Each of the first left and first right cameras 33a and 34a is a camera that performs shooting with a view angle α3 of, for example, 60 to 90 degrees in the horizontal direction and 45 to 60 degrees in the vertical direction. The view angle α3 is preferably narrower than the view angle α4. The view angle α3 is preferably has a width that is suitable when video images taken by the first left and first right cameras 33a and 34a are used for images for electronic mirrors. The view angle α4 is preferably has such a width that video images taken by the second left and second right cameras 33b and 34b are suitable as video images recorded by dashboard cameras.

The right support part 236 shown in FIG. 5 has a configuration identical to that of the left support part 235, and is disposed so that they are symmetrical to each other with respect to the center line extending in the front/rear direction of the vehicle 50. Similarly, the first right camera 34a has a configuration identical to that of the first left camera 33a, and is disposed so that they are symmetrical to each other with respect to the center line extending in the front/rear direction of the vehicle 50. Similarly, the second right camera 34b has a configuration identical to that of the second left camera 33b, and is disposed so that they are symmetrical to each other with respect to the center line extending in the front/rear direction of the vehicle 50.

(Operation)

An example of operations performed by the vehicle video system 200 will be described with reference to FIGS. 4 and 6. An example of operations performed by the vehicle video system 200 is the same as that of the above-described vehicle video system 100 except for the dashboard-camera mode switching step ST3 and the electronic-mirror mode switching step ST4.

The support part operation instruction determination step ST1 and the second position positioning instruction determination step ST2 shown in FIG. 4 are preformed, and the process proceeds to the dashboard-camera mode switching step ST3 or the electronic-mirror mode switching step ST4.

When the process proceeds to the dashboard-camera mode switching step ST3 and hence the mode is switched to the dashboard-camera mode, the support control unit 2 sends a control signal to the left and right support parts 235 and 236, and thereby positions the first left, second left, first right, and second right cameras 33a, 33b, 34a, and 34b at the second positions.

Video images taken by the second left, second right, front, and rear cameras 33b, 34b, 31, and 32 are recorded in the recording unit 41 as video images for the dashboard camera function. The display control unit 10 records video images taken by the second left and second right cameras 33b and 34b in the recording unit 41.

On the other hand, when the process proceeds to the electronic-mirror mode switching step ST4 and hence the mode is switched to the electronic-mirror mode, the support control unit 2 sends a control signal to the left and right support parts 235 and 236. The left and right support parts 235 and 236 position the first left, second left, first right, and second right cameras 33a, 33b, 34a, and 34b at the first positions.

When the first left, second left, first right, and second right cameras 33a, 33b, 34a, and 34b are positioned at the first positions, video images taken by the first left camera 33a is displayed on the left-side monitor 43. Further, in such a case, a video image taken by the first right camera 34a is also displayed on the right-side monitor 44. The video images taken by the first left and first right cameras 33a and 34a have the view angle α3 and are suitable as images used for electronic mirrors. Therefore, it is unnecessary to make the display control unit 10 of the vehicle video system 200 cut out predetermined areas from the video images taken by the first left and first right cameras 33a and 34a in order to generate display video data. The display control unit 10 of the vehicle video system 200 differs from the vehicle video system 200 shown in FIG. 1, and may have a simpler configuration.

When the system is operating in the electronic-mirror mode, the second left and second right cameras 33b and 34b do not need to perform shooting. Further, when the system is operating in the electronic-mirror mode, the second left and second right cameras 33b and 34b may be operated and their video images may be processed to recognize persons or other vehicles. The vehicle video system 200 may monitor an obstacle or the like present in front of the vehicle 50 based on information obtained by the aforementioned processing, and may notify the driver by using the left-side monitor 43, the right-side monitor 44, or the infotainment monitor 45 as required. Video images taken by the second left and second right cameras 33b and 34b may be recorded in the recording unit 41 as appropriate. The angle of view of video images taken by the front camera 31, and the second left and second right cameras 33b and 34b is wider than that of video images taken by the front camera 31 alone. Therefore, it is possible to monitor a large area in the direction to the front of the vehicle 50 by using video images taken by the front camera 31, and the second left and second right cameras 33b and 34b.

Because of the above-described features, according to the vehicle video system 200, it is possible to shoot a view in the direction to the front/rear of the vehicle 50 when the vehicle 50 is being used or is traveling, and to recode the taken video images as in the case of the vehicle video system 100. Meanwhile, when the vehicle 50 is parked, it is possible to shoot views in the directions to the left/right of the vehicle 50, in addition to the view in the directions to the front/rear thereof, and to recode the taken video images. It is possible to monitor areas in the directions to the left/right of the parked vehicle 50 by using the recorded video images as monitoring information.

Further, it is possible to enable the vehicle video system 200 to achieve the above-described effects by using front and rear cameras 31 and 32 used in ordinary dashboard cameras or the like, and first left, second left, first right, and second right cameras 33a, 33b, 34a, and 34b used in ordinary electronic mirrors or the like. That is, it is possible to enable the vehicle video system 200 to achieve the above-described effects by using hardware configurations used in ordinary dashboard cameras and ordinary electronic mirrors without using additional hardware configurations, and thereby to reduce the increase in the cost.

Modified Example 1

Figure 7:
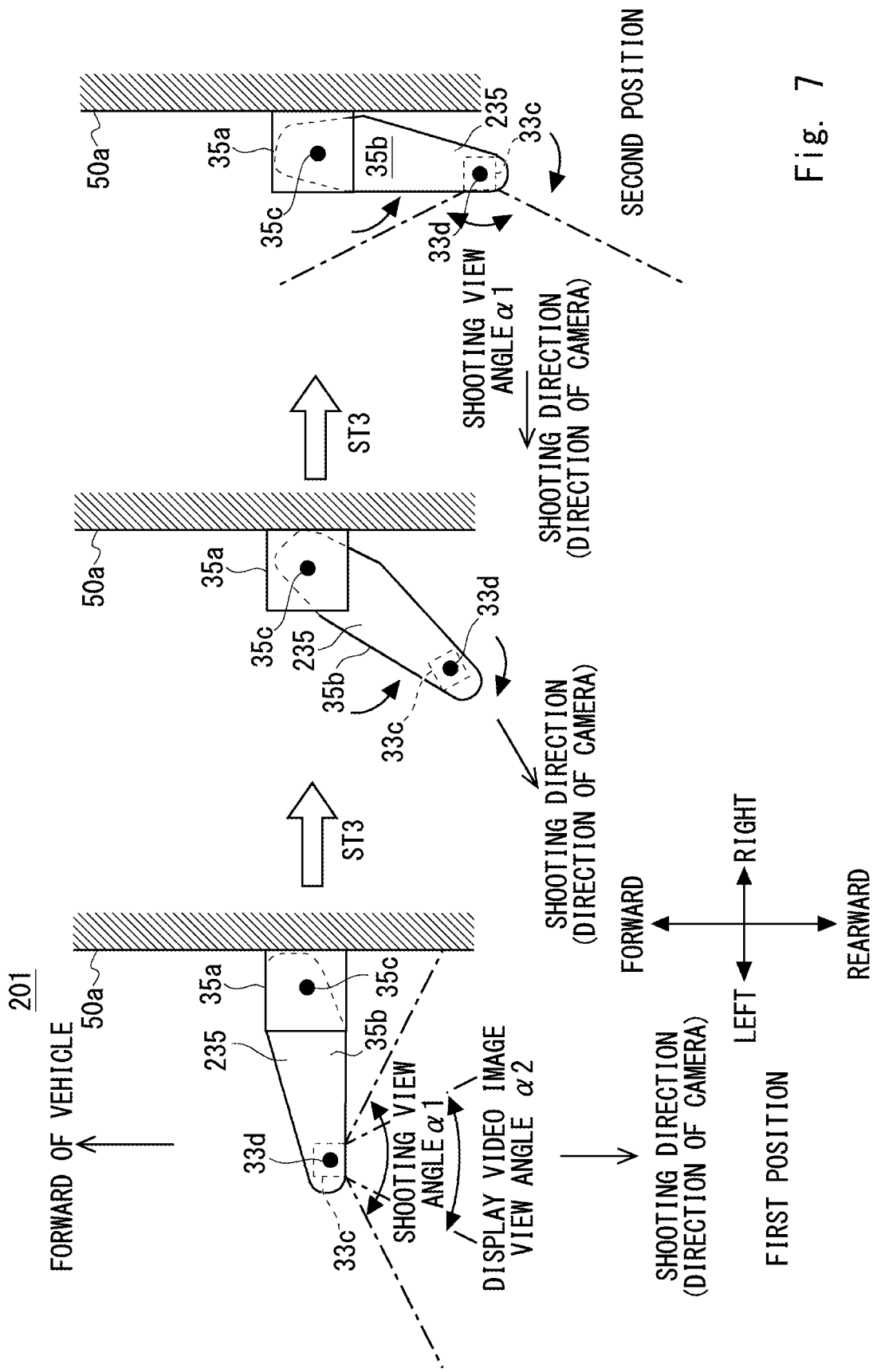
FIG. 7 is a schematic diagram showing an example of operations performed by a modified example of the vehicle video system according to the second embodiment.

Next, a vehicle video system 201 which is a modified example of the vehicle video system 200 will be described with reference to FIG. 7. FIG. 7 is a schematic view showing an example of operations performed by a modified example of a main part of the vehicle video system according to the second embodiment, and is a view of a left-side surface 50a of a vehicle 50 as viewed from above. The vehicle video system 201 has a configuration identical to that of the vehicle video system 200 shown in FIG. 5 except for a left camera 33c and a right camera (not shown).

As shown in FIG. 7, the left camera 33c may be an image-pickup apparatus. The left camera 33c may be a camera used in an ordinary electronic mirror or in an ordinary dashboard camera.

The left camera 33c is disposed at the tip of an arm 35b so as to be rotatable about a shaft 33d. The shaft 33d extends in the vertical direction. The left camera 33c may be equipped with, for example, a power source such as a motor, and is rotated by this power source so as to face in a predetermined direction about the shaft 33d.

The arm 35b shown in FIG. 7 rotates about the shaft 35c, so that the left camera 33c is positioned at a first position or at a second position. When the arm 35b rotates about the shaft 35c, the left camera 33c is rotated about the shaft 35c and faces in a direction different from that of the arm 35b.

When the longitudinal direction of the arm 35b is roughly perpendicular to the left-side surface 50a of the vehicle 50, the left camera 33c is positioned at the first position. In this case, the left camera 33c shoots a view in the direction to the left-rear of the vehicle 50. The left camera 33c outputs the taken video data to the shooting data acquisition unit 1.

When the rear side of the tip of the arm 35b faces the left-side surface 50a of the vehicle 50, the left camera 33c is positioned at the second position. In this case, the left camera 33c shoots a view in the direction to the left of the vehicle 50. The left camera 33 outputs the taken video data to the shooting data acquisition unit 1.

The right camera (not shown) has a configuration identical to that of the left camera 33c, and is disposed so that they are symmetrical to each other with respect to the center line extending in the front/rear direction of the vehicle 50.

(Operation)

Next, an example of operations performed by the vehicle video system 201 will be described. An example of operations performed by the vehicle video system 201 is the same as that of the above-described vehicle video system 200 except for the dashboard-camera mode switching step ST3 and the electronic-mirror mode switching step ST4.

The support part operation instruction determination step ST1 and the second position positioning instruction determination step ST2 shown in FIG. 4 are preformed, and the process proceeds to the dashboard-camera mode switching step ST3 or the electronic-mirror mode switching step ST4.

When the process proceeds to the dashboard-camera mode switching step ST3 and hence the mode is switched to the dashboard-camera mode, the support control unit 2 sends a control signal to the left and right support parts 235 and 236, and thereby positions the left camera 33c and the right camera (not shown) at the second positions. Further, the left camera 33c rotates about the shaft 33d as required and faces in the direction to the rear of the tip of the arm 35b. The right camera (not shown) also rotates in a manner similar to that of the left camera 33c and changes its direction.

Video images taken by the left camera 33c, the right camera (not shown), the front camera 31, and the rear camera 32 are recorded in the recording unit 41 as video images for the dashboard camera function. The display control unit 10 records video images taken by the left camera 33c and the right camera (not shown) in the recording unit 41. The video images taken by the left camera 33c and the right camera (not shown) have a view angle α1. The view angle α1 has preferably such a width that video images taken by the left camera 33c and the right camera (not shown) are suitable as video images recorded by the dashboard cameras.

On the other hand, when the process proceeds to the electronic-mirror mode switching step ST4 and hence the mode is switched to the electronic-mirror mode, the support control unit 2 sends a control signal to the left and right support parts 235 and 236. The left and right support parts 235 and 236 position the left camera 33c and the right camera (not shown) at the first positions. Further, the left camera 33c rotates about the shaft 33d as required and faces in the direction to the front of the tip of the arm 35b. The right camera (not shown) also rotates in a manner similar to that of the left camera 33c and changes its direction.

When the left camera 33c and the right camera (not shown) are positioned at the first positions, a video image taken by the left camera 33c is displayed on the left-side monitor 43. Further, in such a case, a video image taken by the right camera (not shown) is also displayed on the right-side monitor 44. In this case, the display control unit 10 displays video images that are obtained by cutting out predetermined areas from the view angles α1 of the video images taken by the left camera 33c and the right camera (not shown) on the left-side and right-side monitors 43 and 44. A view angle α2 of display video images displayed on the left-side and right-side monitors 43 and 44 is, for example, 60 to 90 degrees in the horizontal direction. The view angle α2 is preferably narrower than the view angle α1. The view angle α2 is preferably has a width that is suitable when the display images are used for images for electronic mirrors.

Because of the above-described features, according to the vehicle video system 201, it is possible to shoot a view in the direction to the front/rear of the vehicle 50 when the vehicle 50 is being used or is traveling, and to recode the taken video images as in the case of the vehicle video system 200. Meanwhile, when the vehicle 50 is parked, it is possible to shoot views in the directions to the left/right of the vehicle 50, in addition to the view in the directions to the front/rear thereof, and to recode the taken video images. It is possible to monitor areas in the directions to the left/right of the parked vehicle 50 by using the recorded video images as monitoring information. Further, it is possible to enable the vehicle video system 201 to achieve the above-described effects by using front and rear cameras 31 and 32 used in ordinary dashboard cameras or the like, and cameras used in ordinary electronic mirrors or dashboard cameras or the like. That is, it is possible to enable the vehicle video system 201 to achieve the above-described effects by using hardware configurations used in ordinary dashboard cameras and ordinary electronic mirrors without using additional hardware configurations, and thereby to reduce the increase in the cost.

According to the vehicle video system 201, the number of left cameras and the number of right cameras are smaller than those in the vehicle video system 200. The configurations of the left and right cameras of the vehicle video system 201 are simpler than those of the vehicle video system 200.

Other Embodiments Etc.

In the above-described embodiments, the function of each part of the vehicle video systems 100, 200 and 201 shown in FIGS. 1 to 7 has been described. However, only requirements for them are that these functions should be implemented as those of the vehicle video systems 100, 200 and 201.

Figure 8:
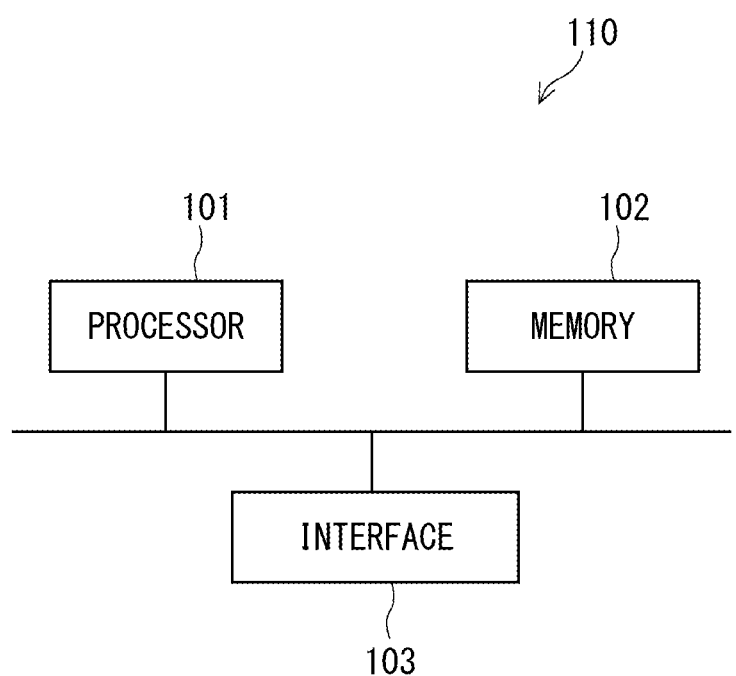
FIG. 8 shows an example of a hardware configuration included in a vehicle video system.

Further, each of the vehicle video systems 100, 200 and 201 according to the above-described embodiments may have a hardware configuration described below. FIG. 8 is a diagram showing an example of a hardware configuration included in each of the vehicle video systems 100, 200 and 201.

A vehicle video system 110 shown in FIG. 8 includes an interface 103 such as an interface for the operation unit 37, a processor 101, and a memory 102. The vehicle video control apparatus 20 described in each of the above-described embodiments is implemented by having the processor 101 load and execute a control program(s) stored in the memory 102. That is, this control program is a program for causing the processor 101 to function as the vehicle video control apparatus 20 shown in FIG. 1 or as a part thereof. This control program is a program for causing the vehicle video system 100 shown in FIG. 1 to perform processes performed in the vehicle video control apparatus 20 or in a part thereof.

The above-described program can be stored and provided to a computer (a computer including an information notification apparatus) using any type of non-transitory computer readable media. Non-transitory computer readable media include any type of tangible storage media. Examples of non-transitory computer readable media include magnetic storage media (such as floppy disks, magnetic tapes, hard disk drives, etc.), and optical magnetic storage media (e.g. magneto-optical disks). Further, the examples include CD-ROM (Read Only Memory), CD-R, and CD-R/W. Further, the examples include semiconductor memories (such as mask ROM, PROM (programmable ROM), EPROM (erasable PROM), flash ROM, RAM (random access memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, in the various embodiments described above, the present invention may be implemented in the form of an image control method as described above as a series of processes performed in the vehicle image systems 100, 200 and 201. The video control method includes first and second steps described below.

The first step is a support control step of controlling a left support part and a right support part so that the left and right support parts can be positioned at first positions and at second positions, the left support part being configured to support a left image-pickup apparatus, the left image-pickup apparatus being disposed on a left side of a vehicle and configured to shoot a view to the left of the vehicle, the right support part being configured to support a right image-pickup apparatus, the right image-pickup apparatus being disposed on a right side of the vehicle and configured to shoot a view to the right of the vehicle, the first positions being positions at which the left image-pickup apparatus faces in a direction to the left-rear of the vehicle and the right image-pickup apparatus faces in a direction to the right-rear of the vehicle, and the second positions being positions at which the left image-pickup apparatus faces in a direction to the left of the vehicle and the right image-pickup apparatus faces in a direction to the right of the vehicle.

The second step is a mode change step of displaying the video images taken by the left and right image-pickup apparatuses on a monitor when the left and right support parts are positioned at the first positions by the support control step, and using the video images taken by the left and right image-pickup apparatuses as monitoring information for monitoring the vehicle when the left and right support parts are disposed at the second positions, the monitor being configured so that a driver of the vehicle can see the monitor.

Note that other examples are the same as those described in the above-described various embodiments. Further, the aforementioned control program is considered to be a video control program for causing a vehicle video system to perform such a video control method.

Note that the present disclosure is not limited to the above-described example embodiments and can be modified as appropriate without departing from the spirit and scope of the present disclosure. Further, the present disclosure may be implemented by combining these example embodiments as desired.

According to the embodiment, it is possible to provide a vehicle video control apparatus, a vehicle video system, a video control method, and a program capable of performing appropriate parking monitoring while preventing (or reducing) the increase in the cost.

What is claimed is:

1. A vehicle video control apparatus comprising:
a support control unit configured to control a left support part and a right support part so that the left and right support parts can be positioned at first positions and at second positions, the left support part being configured to support a left image-pickup apparatus, the left image-pickup apparatus being disposed on a left side of a vehicle and configured to shoot a view to the left of the vehicle, the right support part being configured to support a right image-pickup apparatus, the right image-pickup apparatus being disposed on a right side of the vehicle and configured to shoot a view to the right of the vehicle, the first positions being positions at which the left image-pickup apparatus faces in a direction to a left-rear of the vehicle and the right image-pickup apparatus faces in a direction to a right-rear of the vehicle, and the second positions being positions at which the left image-pickup apparatus faces in a direction to the left of the vehicle and the right image-pickup apparatus faces in a direction to the right of the vehicle;
a display control unit configured to display video images taken by the left and right image-pickup apparatuses on a monitor, the monitor being configured so that a driver of the vehicle can see the monitor;
a recording control unit configured to use the video images taken by the left and right image-pickup apparatuses as monitoring information for monitoring the vehicle; and
a mode change unit configured to make the display control unit display the video images taken by the left and right image-pickup apparatuses on the monitor, which the driver of the vehicle can see, when the left and right support parts are positioned at the first positions by the support control unit, and make the recording control unit use the video images taken by the left and right image-pickup apparatuses as the monitoring information for monitoring the vehicle when the left and right support parts are disposed at the second positions,
wherein the support control unit moves the left and right support parts from the first positions so that the left and right support parts move closer to the vehicle, and eventually positions the left and right support parts at the second positions.

2. The vehicle video control apparatus according to claim 1, wherein the display control unit displays video images that are taken by the left and right image-pickup apparatuses and displayed on the monitor, which the driver of the vehicle can see, with an angle of view narrower than that of video images that are taken by the left and right image-pickup apparatuses and used by the record control unit as monitoring information for monitoring the vehicle.

3. A vehicle video system comprising:
the vehicle video control apparatus according to claim 1; and
the left and right image-pickup apparatuses, wherein
each of the left and right image-pickup apparatuses includes a first camera and a second camera, when the left and right support parts are positioned at the first positions, the first cameras face in directions to the left-rear and right-rear of the vehicle, when the left and right support parts are disposed at the second positions, the second cameras face in directions to the left and right of the vehicle, and an angle of view of taken video images taken by the second cameras is wider than that of taken video images taken by the first cameras.

4. A video control method comprising:

a support control step of controlling a left support part and a right support part so that the left and right support parts can be positioned at first positions and at second positions, the left support part being configured to support a left image-pickup apparatus, the left image-pickup apparatus being disposed on a left side of a vehicle and configured to shoot a view to the left of the vehicle, the right support part being configured to support a right image-pickup apparatus, the right image-pickup apparatus being disposed on a right side of the vehicle and configured to shoot a view to the right of the vehicle, the first positions being positions at which the left image-pickup apparatus faces in a direction to a left-rear of the vehicle and the right image-pickup apparatus faces in a direction to a right-rear of the vehicle, and the second positions being positions at which the left image-pickup apparatus faces in a direction to the left of the vehicle and the right image-pickup apparatus faces in a direction to the right of the vehicle; and a mode change step of displaying video images taken by the left and right image-pickup apparatuses on a monitor when the left and right support parts are positioned at the first positions by the support control step, and using the video images taken by the left and right image-pickup apparatuses as monitoring information for monitoring the vehicle when the left and right support parts are disposed at the second positions, the monitor being configured so that a driver of the vehicle can see the monitor, wherein, in the support control step, the left and right support parts are moved from the first positions so that the left and right support parts move closer to the vehicle, and eventually the left and right support parts are positioned at the second positions.

5. A non-transitory computer-readable medium that stores a program for causing a computer operating as a vehicle video control apparatus to perform:

a support control step of controlling a left support part and a right support part so that the left and right support parts can be positioned at first positions and at second positions, the left support part being configured to support a left image-pickup apparatus, the left image-pickup apparatus being disposed on a left side of a vehicle and configured to shoot a view to the left of the vehicle, the right support part being configured to support a right image-pickup apparatus, the right image-pickup apparatus being disposed on a right side of the vehicle and configured to shoot a view to the right of the vehicle, the first positions being positions at which the left image-pickup apparatus faces in a direction to a left-rear of the vehicle and the right image-pickup apparatus faces in a direction to a right-rear of the vehicle, and the second positions being positions at which the left image-pickup apparatus faces in a direction to the left of the vehicle and the right image-pickup apparatus faces in a direction to the right of the vehicle; and a mode change step of displaying video images taken by the left and right image-pickup apparatuses on a monitor when the left and right support parts are positioned at the first positions by the support control step, and using the video images taken by the left and right image-pickup apparatuses as monitoring information for monitoring the vehicle when the left and right support parts are disposed at the second positions, the monitor being configured so that a driver of the vehicle can see the monitor, wherein, in the support control step, the left and right support parts are moved from the first positions so that the left and right support parts move closer to the vehicle, and eventually the left and right support parts are positioned at the second positions.

\* \* \* \* \*